(12) United States Patent
Hainberger et al.

(10) Patent No.: US 7,428,349 B2
(45) Date of Patent: Sep. 23, 2008

(54) ADAPTIVE POLARIZATION ADJUSTMENT APPARATUS FOR CONTROLLING POLARIZATION OF LIGHT INPUTTED TO POLARIZATION-MAINTAINING WAVEGUIDE COMPONENTS

(75) Inventors: Rainer Hainberger, Vienna (AT); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 10/596,602

(22) PCT Filed: Mar. 25, 2004

(86) PCT No.: PCT/JP2004/004187

§ 371 (c)(1),
(2), (4) Date: Jun. 19, 2006

(87) PCT Pub. No.: WO2005/093497

PCT Pub. Date: Oct. 6, 2005

(65) Prior Publication Data

US 2007/0091310 A1    Apr. 26, 2007

(51) Int. Cl.
*G02B 6/00* (2006.01)

(52) U.S. Cl. .................. 385/11; 356/364; 356/369
(58) Field of Classification Search .............. None
See application file for complete search history.

(56) References Cited

U.S. PATENT DOCUMENTS

| | | | | |
|---|---|---|---|---|
| 6,016,213 A | * | 1/2000 | Farber et al. ........... | 398/177 |
| 6,038,357 A | * | 3/2000 | Pan ..................... | 385/24 |
| 6,768,824 B2 | * | 7/2004 | Ramachandran ......... | 385/11 |
| 6,856,386 B2 | * | 2/2005 | Anderson et al. ........ | 356/73.1 |
| 6,961,129 B2 | * | 11/2005 | Law et al. .............. | 356/493 |
| 7,209,660 B1 | * | 4/2007 | Yee et al. .............. | 398/71 |
| 2002/0176080 A1 | * | 11/2002 | Iwata ................... | 356/369 |
| 2002/0191265 A1 | * | 12/2002 | LaGasse et al. ......... | 359/246 |

FOREIGN PATENT DOCUMENTS

| | | | |
|---|---|---|---|
| JP | 2-24636 | | 1/1990 |
| JP | 02024636 | * | 1/1990 |
| JP | 2001-356378 | | 12/2001 |
| JP | 2001356378 | * | 12/2001 |

OTHER PUBLICATIONS

European Patent Office Communication mailed Feb. 6, 2007, and issued in corresponding European Patent Application No. 04 723 310.1-2205.

* cited by examiner

*Primary Examiner*—Sung Pak
*Assistant Examiner*—Chad H Smith
(74) *Attorney, Agent, or Firm*—Staas & Halsey LLP

(57) ABSTRACT

A nonlinear birefringent waveguide is used for four wave mixing, wavelength conversion, Raman amplification, etc. In order to adjust the polarization of the input light to such waveguide 14, a polarization controller 10 is provided. And at the output side of the waveguide 14, a polarization beam splitter is provided. The polarization beam splitter splits one of orthogonal polarizations which is not desired to be passed through. The power of the split light is detected at photodiode 13. The detection signal of the photodiode 13 is fed back to the polarization controller 10. The polarization controller 10 controls the polarization of input light so that the power of light detected at the photodiode 13 is minimized.

6 Claims, 16 Drawing Sheets

US 7,428,349 B2

ADAPTIVE POLARIZATION ADJUSTMENT APPARATUS FOR CONTROLLING POLARIZATION OF LIGHT INPUTTED TO POLARIZATION-MAINTAINING WAVEGUIDE COMPONENTS

This application is based on and hereby claims priority to PCT Application No. PCT/JP2004/004187 filed on Mar. 25, 2004, the contents of which are hereby incorporated by reference.

TECHNICAL FIELD

This invention relates to the control apparatus for controlling the polarization of light inputted to polarization-maintaining (PM) waveguide components, in particular, to highly nonlinear polarization-maintaining waveguide components.

BACKGROUND ART

Many waveguide components used in optical transmission systems have polarization-dependent, more specifically polarization maintaining, characteristics and thus require the coupling of the input light into a principal axis of polarization. Among these polarization-maintaining components are nonlinear optical waveguides, such as small-effective area microstructured fibers and semiconductor-based components utilizing sub-band transitions, which enable all-optical signal processing at ultra-high speeds, e.g., wavelength conversion, all-optical 2R and 3R regeneration, and supercontinuum generation.

The capability of coupling the optical power into one of the two principal axes of polarization-maintaining components in a precisely controllable way becomes of utmost importance. In the case of a static linear input polarization (e.g., light originating from a laser source) it is sufficient to directly connect the source and the waveguide device (e.g., a modulator) with a polarization maintaining fiber (PMF) aligned such that the linear polarization is maintained and coupled into the desired principal axis of polarization of the waveguide. In the case the input polarization is static but with a nonlinear state of polarization (any state of polarization except a linear one, e.g., elliptic polarization, circular polarization), a polarization controller (PC) is used to transfer the state of polarization of the light source into a linear polarization at the input of the waveguide. One way is to use a Q(uarter)/H(alf)/Q(uarter) lambda polarization controller comprising a λ/4-, a λ/2-, and a λ/4-waveplate, with adjustable relative orientation of their principal axes of polarization, which allows the transformation of an arbitrary state of polarization into another arbitrary state of polarization, has to be adjusted such that the polarization of the light becomes linear at the PM-waveguide input. If properly aligned PM-components are used between PC and PM-waveguide it is sufficient to use a Q/H lambda PC. The λ/4-waveplate allows transforming an arbitrary elliptic polarization into a linear polarization and the λ/2-waveplate allows rotating this linear polarization state to an arbitrary angle.

At points of an optical fiber transmission line other than the laser source, the state of polarization usually changes over time because of a change of temperature or stress on the optical fiber. One way to deal with such a non-static state of the input polarization to a waveguide component which has polarization-dependent characteristics is to apply a polarization diversity scheme. In such a scheme, the two polarization components are separated by a polarization beam splitter (PBS) and treated independently such that the device characteristics become virtually polarization-independent. However, this scheme usually is not suitable for all-optical signal processing applications, which employ nonlinear effects proportional to the signal power, because it is uncertain how the signal power is distributed between the two principal axes of polarizations and because nonlinear effects are proportional to the input power.

A second way that is also compatible with all-optical signal processing applications is the adaptive adjustment of the input polarization by means of a polarization controller before the PM-waveguide such that all the signal light is coupled into one principal axis of the PM-waveguide. A commonly used approach is to place a PBS after the Q/H PC. One port is used to supply a linear input polarization to the PM-waveguide component and the other port is used for monitoring purposes. By minimizing the signal power coupled into the polarization state used for monitoring, the PCs can adaptively adjust the polarization of input light such that all the power passes through the PBS. In order to couple the thus obtained linear polarization at the output of the PBS into a principal axis of the waveguide (PM-waveguide), the two components have to be connected by PM-components. Another option is to use non-PM components. Assuming that the polarization transfer function of these components does not change over time, a static H/Q PC can be used after the PBS.

FIG. 1 and FIG. 2 show conventional control apparatus of polarization.

In FIG. 1, one example of conventional polarization control apparatus is shown. The light with arbitrary polarization is inputted to PC 10. The polarization of the inputted light is adjusted by PC 10 and the adjusted light is inputted to a polarization maintaining fiber 12 and propagates in the polarization maintaining fiber 12 to be inputted to PBS 11. By PBS 11, a part of the adjusted light with one polarization is sent through and the other part of the adjusted light with another polarization orthogonal to the one polarization is dropped to PD 13. The PD 13 detects the power of the dropped light and feeds it back to PC 10 to minimize the power of the dropped light by changing the state of polarization of the input light to PC 10.

The light which passes through PBS 11 is inputted to a polarization maintaining fiber 12 and sent to waveguide 14. Here, the waveguide 14 is an optically nonlinear medium used for an optical switch, a 3R regenerator, a wavelength converter or the like. The light inputted to the waveguide 14 is signal-processed without being converted to an electrical signal. In the case of FIG. 1, an additional polarization maintaining fiber 12 is provided between PBS 11 and waveguide 14, because adjusted state of polarization needs to be kept to the input of the waveguide 14, which causes costly difficult alignment of the components and is the problem.

In FIG. 2, the polarization of the light inputted to PC 10 is adjusted to a suitable one for the input to the waveguide 14. The polarization maintaining fiber 12 maintains the adjusted polarization. The PBS 11 in the middle of the polarization maintaining fiber splits orthogonal polarizations one of which is passed through to PC 15 and the other of which is dropped to PD 13. The PD 13 detects the power of the dropped light and feeds it back to PC 10 for adjustment of the polarization of the input light. The through light of PBS 11 is inputted to PC 15 through the polarization maintaining fiber and its polarization is again adjusted precisely to the suitable polarization for the input to the waveguide 14 just before the waveguide 14. In the waveguide 14, the light is signal-processed and outputted to output port. In FIG. 2, the function of the waveguide 14 is the same as in FIG. 1. In this case, an additional PC 15 is needed to make the state of the polarization suitable for the input to waveguide 14, which causes additional cost and complex device configuration.

In the above configuration, the state of the polarization is adjusted to a suitable state for the input to waveguide 14. "Suitable" means that the state of the polarization is made linear and the direction of the linear polarization is matched to one of the principal axes (fast axis or slow axis) of the waveguide 14. Otherwise, the light splits into two lights which have orthogonal polarizations to each other in the waveguide 14 and propagate in different speeds in the waveguide 14. Therefore, after outputted from the waveguide 14, the light signal becomes superposition of two light signals shifted to each other, which causes deterioration of the optical signal. Therefore, when the nonlinear waveguide 14 is used, the direction of polarization of the input light to the waveguide 14 has to be matched to the principal axis of the waveguide 14.

The act of "polarization maintaining" (PM) is explained below.

When a conventional single mode fiber is bent or twisted, stresses are induced in the fiber. These stresses will change the polarization state of light traveling through the fiber. If the fiber is subjected to any changes in position or temperature, then the final output polarization will vary with time. This means that a linear state of polarization cannot be reliably maintained until the output of the fiber even in short lengths of fiber.

Polarization maintaining fibers (PM fibers) overcome this problem. In these fibers structural stress is intentionally induced during the fabrication process. This structural stress induces a difference in the speed of light for two perpendicular polarizations traveling through the fiber. This birefringence creates two principal axes within the fiber, known respectively as the fast and slow axes of the fiber. Provided the input light into a PM fiber is linearly polarized and orientated along one of these two axes, then the output from the fiber will remain linearly polarized and aligned with that axis, even when subjected to external stresses.

This also can be used for PM-waveguides other than fibers: a PM waveguide is characterized by principal axes of polarizations; if linearly polarized light is coupled into one of the two principal axes in a PM waveguide, then the output light from the waveguide will remain linearly polarized and aligned with that axis. The orientation of the principal axes is wavelength independent.

As a prior art, patent document 1 describes an optical source comprising polarization control output means. The polarization control output means receives a plurality of lights, makes the plurality of lights polarized in the same direction, and keeps the polarization-controlled lights in array.

[Patent Document 1]

Japanese Patent Application Publication No. 2001-356378

DISCLOSURE OF INVENTION

The object of the present invention is to provide a control apparatus for adjusting the input polarization to polarization-maintaining waveguide components, in particular, to highly nonlinear polarization-maintaining waveguide components.

The above object is achieved by providing a control apparatus for an adaptive adjustment of the input polarization to a polarization-maintaining waveguide component, comprising: a polarization control unit controlling a polarization state of an input light to the polarization-maintaining waveguide component according to an input signal fed back from an output side of the polarization-maintaining waveguide component so that a polarization of an input light to the polarization maintaining waveguide component matches to a principal axis of polarization of the polarization maintaining waveguide component; and a polarization monitor unit monitoring the polarization state at an output of the polarization-maintaining waveguide component and feeding back a monitoring result to the polarization control unit as the input signal.

According to the present invention, the polarization monitor unit is provided at the output of the polarization maintaining waveguide component and the light from the output is monitored of its polarization. Then, the signal of the monitored result is provided to the polarization control unit.

By placing the polarization monitor unit at the output of the polarization maintaining waveguide component, additional PC or additional polarization maintaining fiber is no longer needed. Then, the present invention simplifies alignment of the components and reduces cost for aligning the components.

BEST MODE FOR CARRYING OUT THE INVENTION

Figure 1:
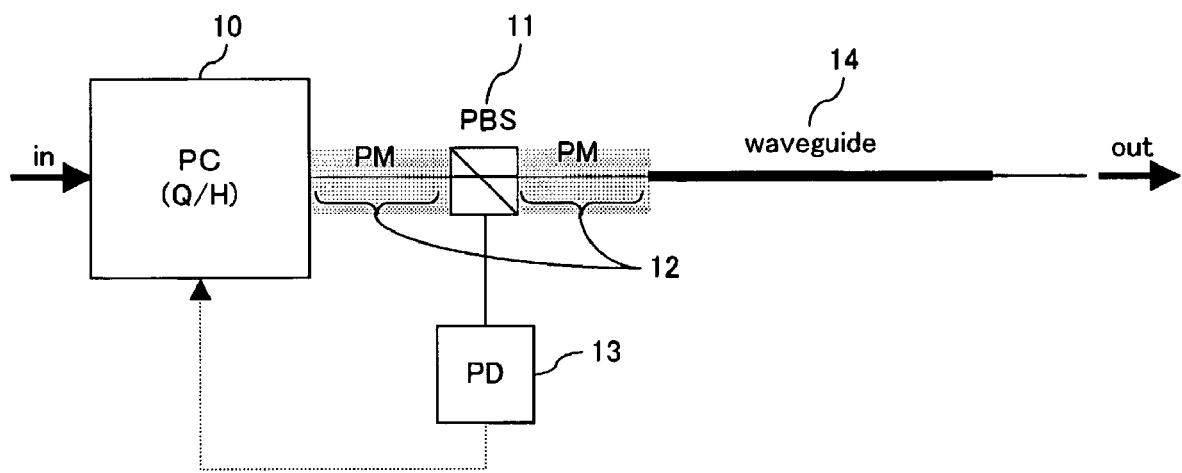
FIG. 1 and FIG. 2 show conventional control apparatus of polarization.
Figure 2:
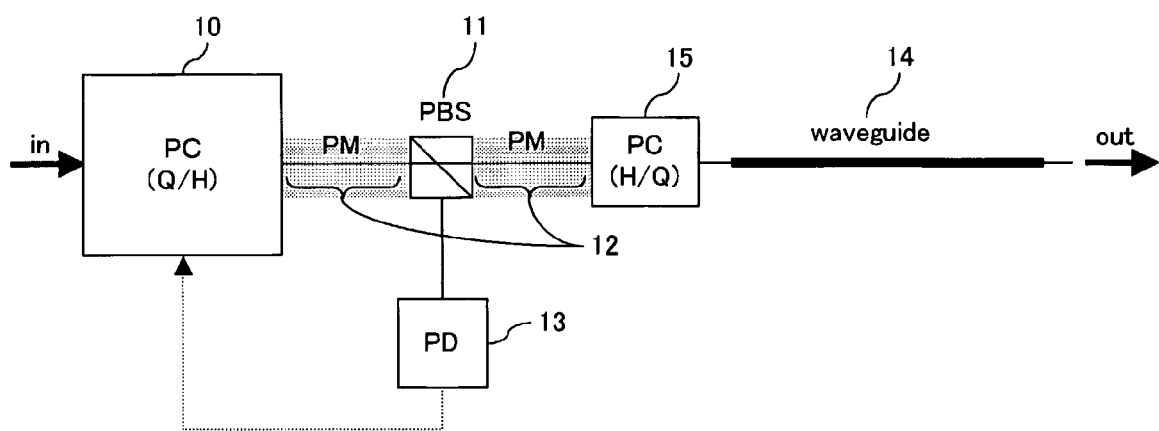
Figure 3:
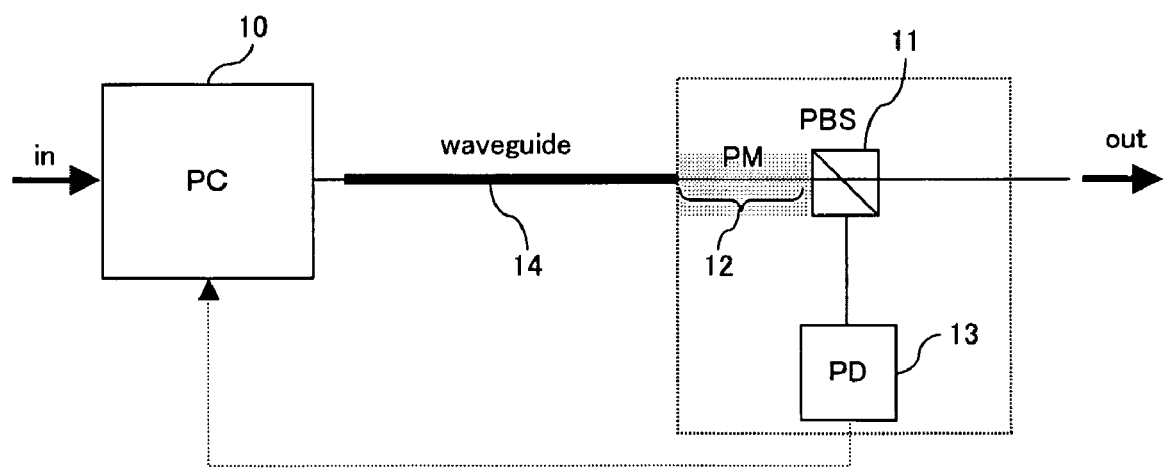
FIG. 3 shows the first embodiment of the present invention.

The embodiments of the present invention are described in reference to the attached drawings in which like numbers are attached to the like components In the embodiment of the present invention, the apparatus for controlling input polarization to the nonlinear waveguide components is configured such that all the light is coupled into a principal axis of polarization avoiding the need for polarization maintaining components or additional PCs between the adaptively adjustable Q/H/Q-PC and the waveguide component monitoring the light at the output of the PM-waveguide FIG. 3 shows the first embodiment of the present invention.

A first embodiment employs a PBS 11 after the birefringent optical waveguide 14 (hereinafter this is expressed by waveguide 14 and means as described in the background paragraph). The PBS 11 is either directly attached to the waveguide 14 or connected to it by means of a polarization maintaining fiber 12. The PBS 11 is aligned to the waveguide 14 such that the light of the desired principal axis of propagation of the waveguide 14 couples to the through-port of the PBS 11. The light outputted from the drop-port is monitored a photodiode PD 13. By minimizing the optical power of light which is outputted from drop-port of PBS 11 and has different polarization from the one matching to the desired principal axis of the waveguide 14, the input polarization is adjusted. This means that the polarization component which matches to the desired principal axis is made maximum and another polarization component is made 0. Therefore, the light adjusted as above is prepared in the state that only the desired polarization is included.

Figure 4:
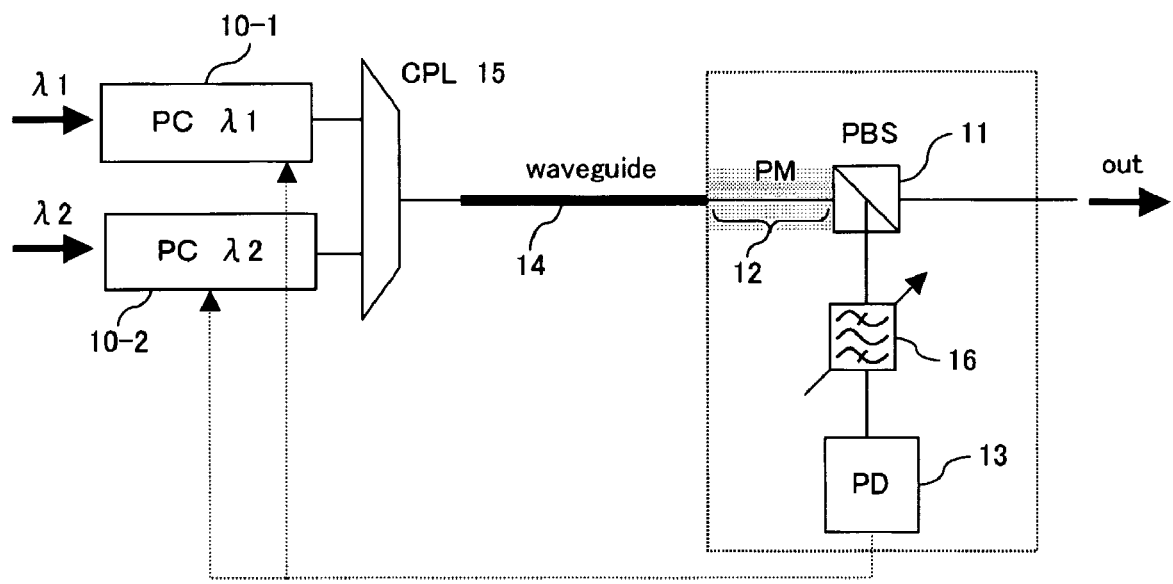
FIGS. 4 and 5 shows the second and third embodiment of the present invention.
Figure 5:
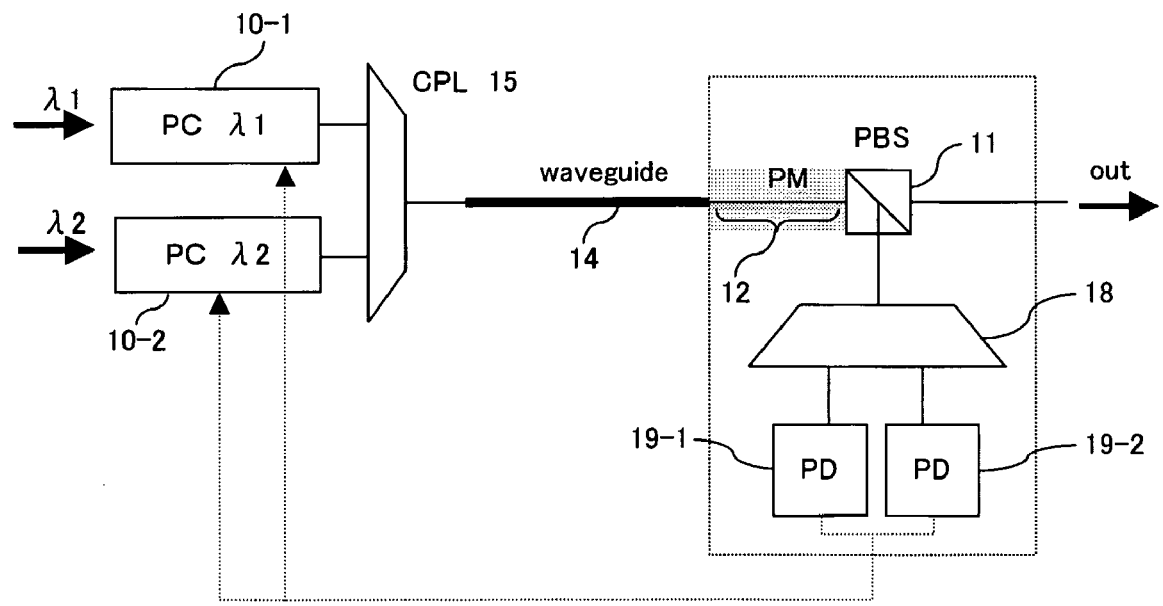

FIGS. 4 and 5 shows the second and third embodiment of the present invention.

For applications in which two or more wavelengths have to be coupled into the waveguide 14, a tunable wavelength filter 16 (FIG. 4) or a wavelength demultiplexer 18 (FIG. 5) can be used in the monitoring branch of the PBS 11 in order to allow for wavelength selective alignment of the polarization axes. For this kind of application the advantage of placing the PBS 11 after the waveguide 14 is that the wavelength multiplexer 15 before the waveguide 14 has not to be polarization maintaining, thus reducing the overall required alignment steps of polarization axis of polarization maintaining components.

In FIG. 4, polarization controllers 10-1 and 10-2 are provided for each wavelength. In the figure, although only two wavelengths are shown, but the embodiment is not restricted to multiplexing only two wavelengths and can have arbitrary number of wavelengths. If more than two wavelengths are provided, the corresponding number of PCs are also provided for each wavelength.

At PCs 10-1 and 10-1, the polarizations of light of each wavelength are adjusted independently to each other for a suitable state to be inputted to the waveguide 14. Each light from PCs 10-1 and 10-2 is coupled by coupler 15 and is inputted to the waveguide 14. A polarization maintaining fiber 12 is attached to the output of the waveguide 14. The light propagated through the waveguide 14 is inputted to PBS 11 via PI-fiber 12. At the PBS 11, one of polarizations orthogonal to each other is dropped to the tunable wavelength filter 16 for each wavelength. The tunable wavelength filter 16 selects one of two wavelengths and the light of the selected wavelength is inputted to PD 13. The PD 13 detects the power of the light and feeds it back to PC 10-1 or 10-2 depending on the wavelength selected. Changing the wavelength that the tunable wavelength filter 16 selects allows for adjusting the polarization for each wavelength.

In FIG. 5, the tunable wavelength filter 16 in FIG. 4 is replaced by the wavelength demultiplexer 18. By using two PDs 19-1 and 19-2, both wavelengths are monitored simultaneously, thereby eliminating the process of changing the wavelength to be monitored. The operation of the other components is the same as FIG. 4. Therefore, the explanation of that is omitted.

Figure 6:
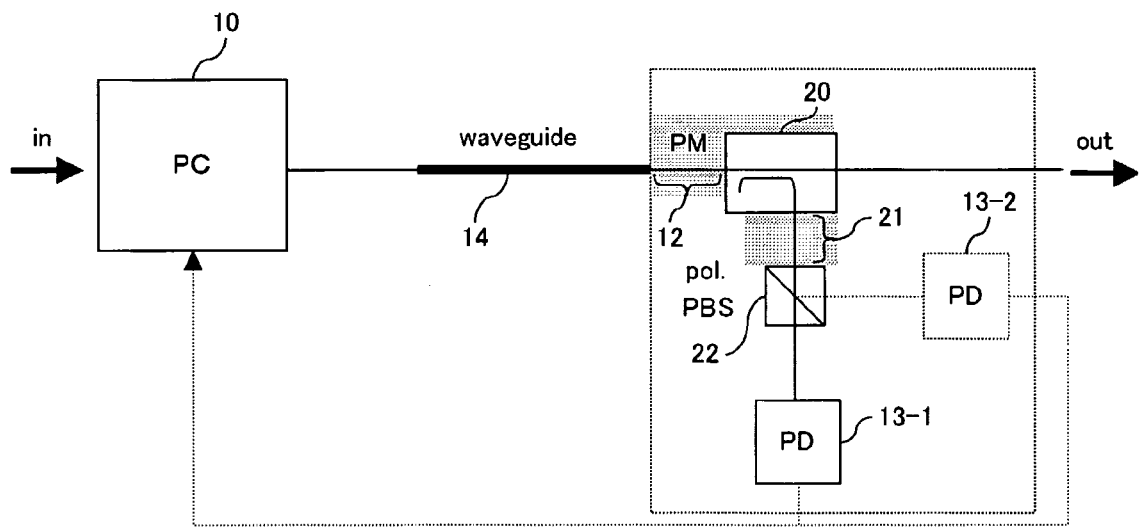
FIG. 6 shows the fourth embodiment of the present invention.

FIG. 6 shows the fourth embodiment of the present invention.

Another type of preferred configuration combines the control apparatus for adjusting the input polarization to polarization-maintaining waveguide components 14 with the functionality of power monitoring. A portion of the output light of the waveguide 14 is coupled to a polarizer 22 by means of a polarization maintaining optical power divider 20. The optical power divider 20 is either directly attached to the waveguide 14 or connected to it by means of a polarization maintaining fiber 12. The polarizer 22 is either directly attached to or integrated with the optical power divider 20, or connected to it by means of a polarization maintaining fiber 21. The waveguide 14, the optical power divider 20, and the polarizer 22 have to be aligned with each other such that their principal axes are all parallel. The through-axis of the polarizer 22 is aligned to the desired principal axis of polarization of the waveguide 14. A photodiode 13-1 is attached to the output port of the polarizer 22 allowing detection of the optical power in the desired linear polarization state. The input polarization is adjusted such that the photodiode signal is maximized. Since the loss between waveguide input and photodiode is well known, the photodiode signal can be used for power monitoring.

In FIG. 6, a polarization filter or PBS can be used as polarizer 22. When the polarization filter is used, PD 13-2 is not provided. The polarization filter passes only one polarization and the light with the polarization is detected by PD 13-1. The other operations are the same as described before.

When PBS is used, both ports of PBS 22 are connected to PDs 13-1 and 13-2 respectively. As power divider 20 divides input light into two lights which include both polarizations, the lights with each polarization are detected by PDs 13-1 and 13-2 respectively. In this case, detection signals of either PD 13-1 or PD 13-2 can be used to feed back to PC 10. As both polarizations are detected by PD 13-1 and 13-2 in the case of PBS, total light is detected which propagates the waveguide 14. Then, it is enabled to determine whether or not the optical signal to propagate in the waveguide 14 exists, thereby enabling to monitor the existence or disappearance of the optical signal, which is needed for system monitoring.

For the power divider 20, the polarization independent coupler is usable. See, "Optical fiber telecommunication 111B" by I. P. Kaminov and T. L. Koch, Academic press, 1997, Chapter 8, IX. B. pages 362-363.

Figure 7:
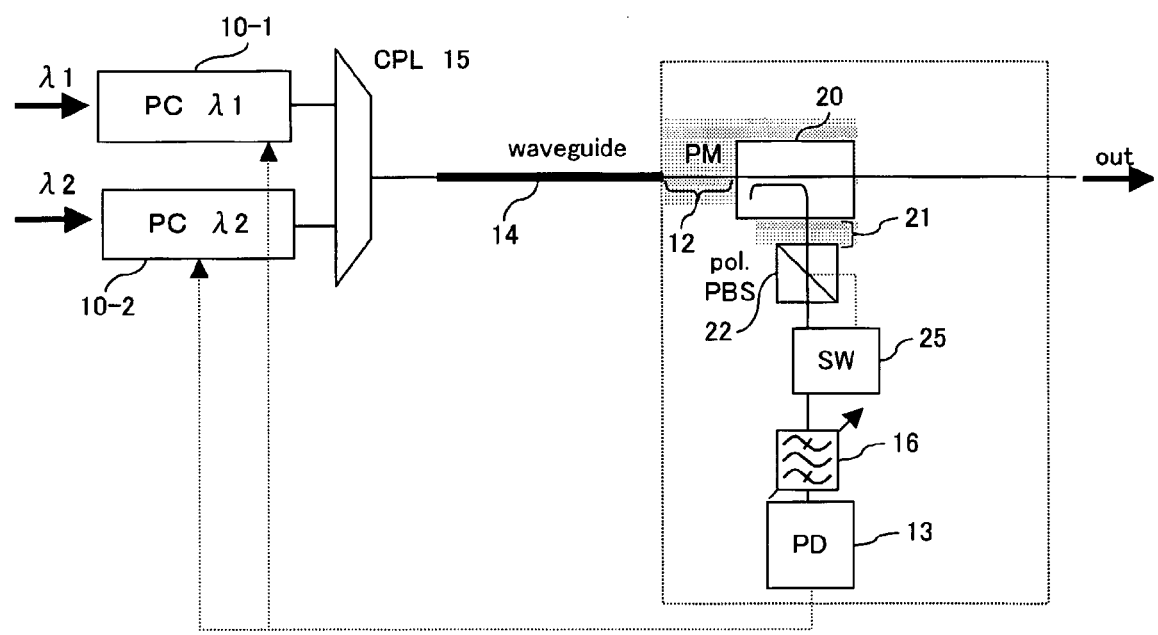
FIG. 7 shows the fifth embodiment of the present invention.

FIG. 7 shows the fifth embodiment of the present invention.

In addition, a non-PM tunable polarization maintaining tunable wavelength filter can be added after the polarizer in order to allow for wavelength selective alignment and monitoring. In FIG. 7, a plurality of wavelengths is used. The power divider 20 is attached directly to the waveguide 14 or connected to the waveguide 14 via a polarization maintaining fiber 12. And the power divider 20 is attached to or integrated with the polarizer 22 or connected to it via a polarization maintaining fiber 21. Further, the power divider 20 itself is a polarization independent device. The power divider 20 divides the light and dropped light is inputted to polarizer. The polarizer can be a polarization filter or PBS. In the case of a polarization filter, a switch 25 is not provided because the polarization filter passes only one polarization. By selecting the wavelength of the light by the tunable wavelength filter 16, the polarization for each wavelength is adjusted. In the case of PBS, both polarizations which are orthogonal to each other are outputted from each port. Each port is connected to switch 25. By switching the path by the switch 25, light of both polarizations can be monitored, enabling to monitor the existence or disappearance of the optical signal.

Figure 8:
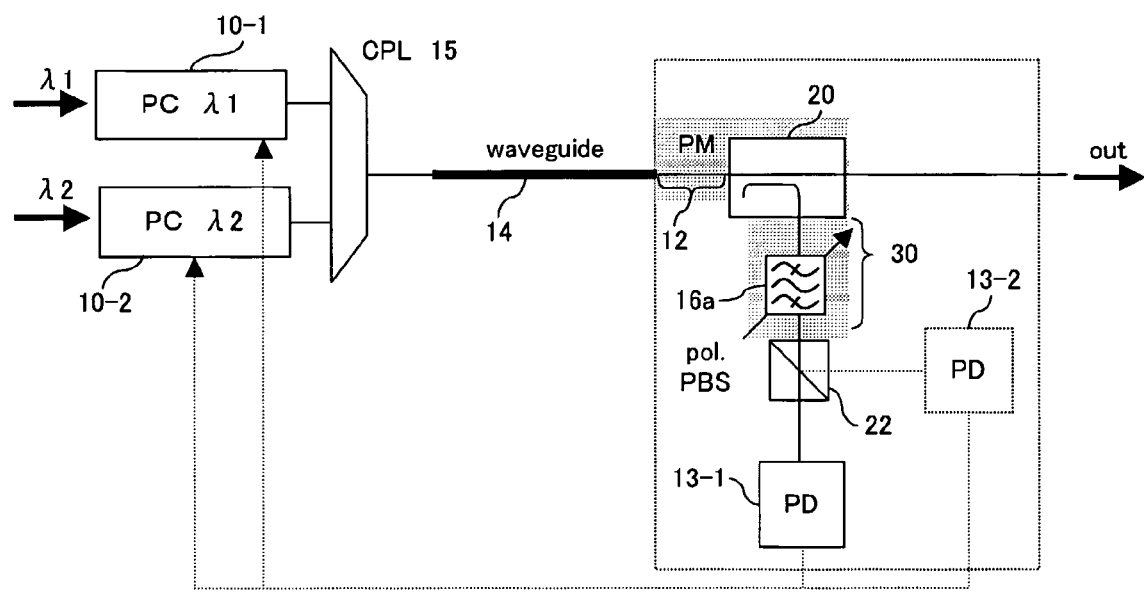
FIG. 8 shows the sixth embodiment of the present invention.

FIG. 8 shows the sixth embodiment of the present invention.

Alternatively to placing the wavelength selection means after the polarizer/PBS, it may be placed before it. In FIG. 8, the power divider 20 is attached directly to the waveguide 14 or connected to it via a polarization maintaining fiber 12. The power divider 20 itself is a polarization independent device. The power divider 20 is connected to or integrated with a tunable wavelength filter 16a. And the tunable wavelength filter 16a is connected to polarizer 22. The connecting optical fiber from the power divider 20 to the polarizer 22 is a polarization maintaining one 30. But the tunable wavelength filter 16a is a polarization independent filter.

For a polarization independent tunable wavelength filter, see

"Polarization independent, linear-tuned interference filter with constant transmission characteristics over 1530-1570-nm tuning range" Mekada, N.; Al-Hamdan, A; Chong, T. H.; Daut, D. G.; Photonics Technology Letters, IEEE, Volume 9, Issue 6, June 1997, pages 782-784.

Figure 9:
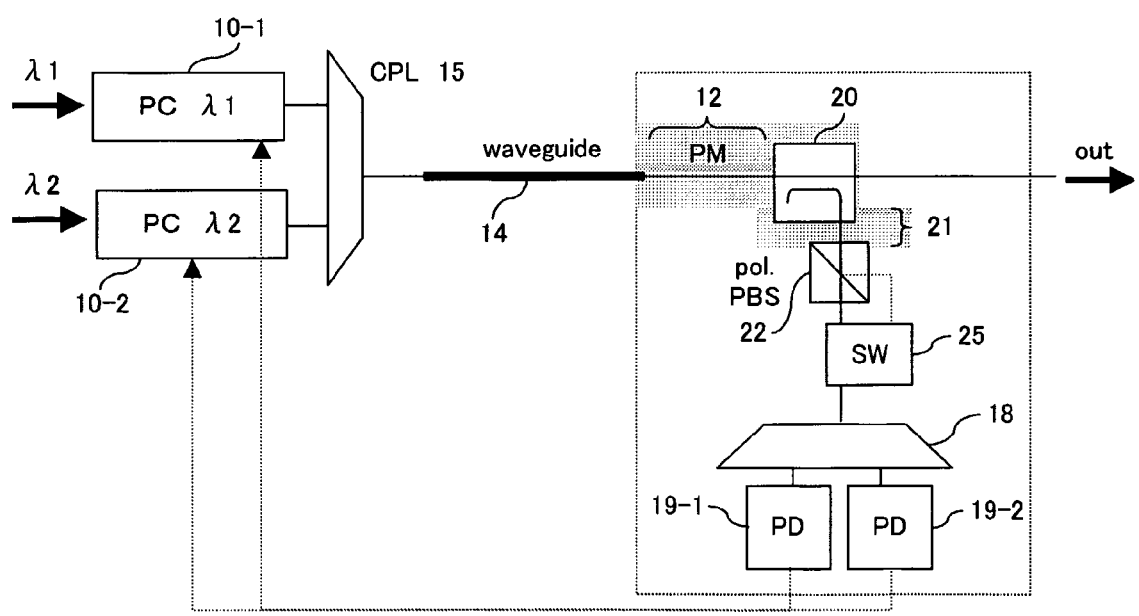
FIG. 9 shows the seventh embodiment of the present invention.

FIG. 9 shows the seventh embodiment of the present invention.

Another option is to use a non-PM wavelength demultiplexer after the polarizer with two or more ports. The lights demultiplexed by the wavelength demultiplexer 18 are detected by PDs 19-1 and 19-2 respectively. In FIG. 9, the tunable wavelength filter 16 is replaced by the wavelength demultiplexer 18 compared to FIG. 7. This configuration enables for adjusting polarizations for multiple wavelengths simultaneously.

These configurations can be modified in such a way that instead of a polarizer a polarization beam splitter is used. By using an optical switch before the wavelength selection means, the two polarization axes of the PBS can be monitored alternatively.

Figure 10:
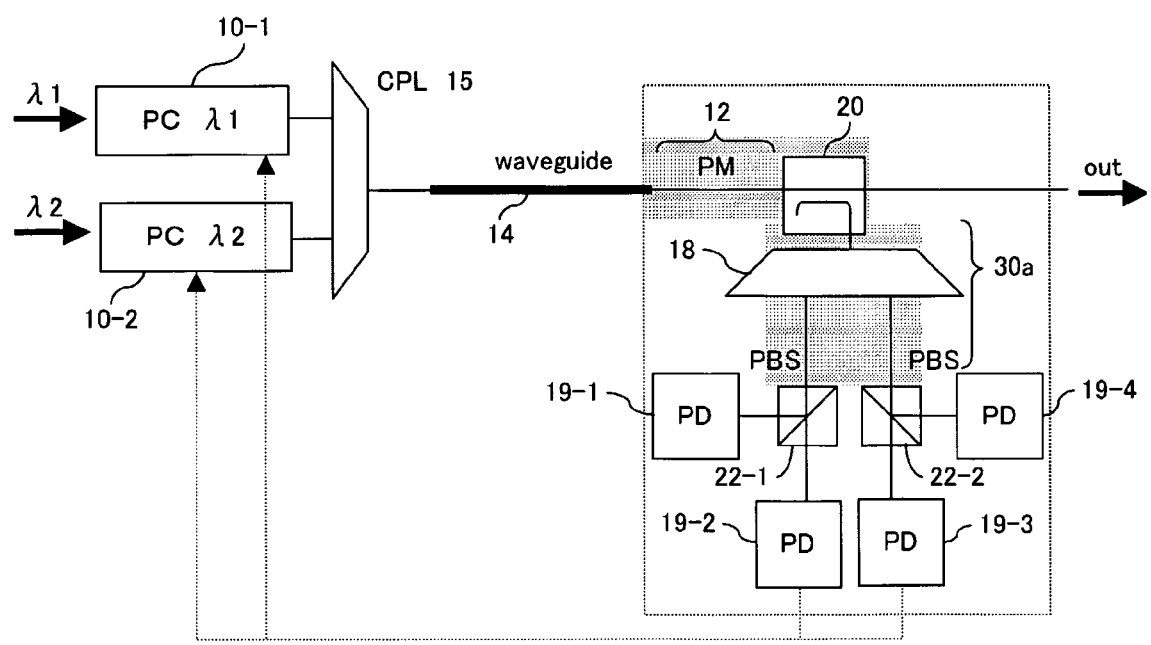
FIG. 10 shows the eighth embodiment of the present invention.

FIG. 10 shows the eighth embodiment of the present invention.

Alternatively to placing the wavelength selection means after the polarizer/PBS, it may be placed before it. In FIG. 10, the tunable wavelength filter 16a is replaced by the wavelength demultiplexer 18 compared to FIG. 8. Connections (12, 30a) between the waveguide 14 and the power divider 20, the power divider 20 and the wavelength demultiplexer 18, and the wavelength demultiplexer 18 and PBSs should be polarization maintaining ones, and the power divider 20 and the wavelength demuliplexer 18 are preferably polarization independent ones.

For a polarization independent wavelength demultiplexer, see "Extremely small polarization independent phased-array demultiplexers on InP", Bissessur, H.; Pagnod-Rossiaux, P.; Mestric, R.; Martin, B.; Photonics Technology Letters, IEEE, Volume 8, Issue 4, April 1996, pages 554-556.

Other configurations can be based on the same concept but with the optical power divider(s) placed at the input port(s) of the waveguide 14, which has the drawback that it reduces the optical input power.

Figure 11:
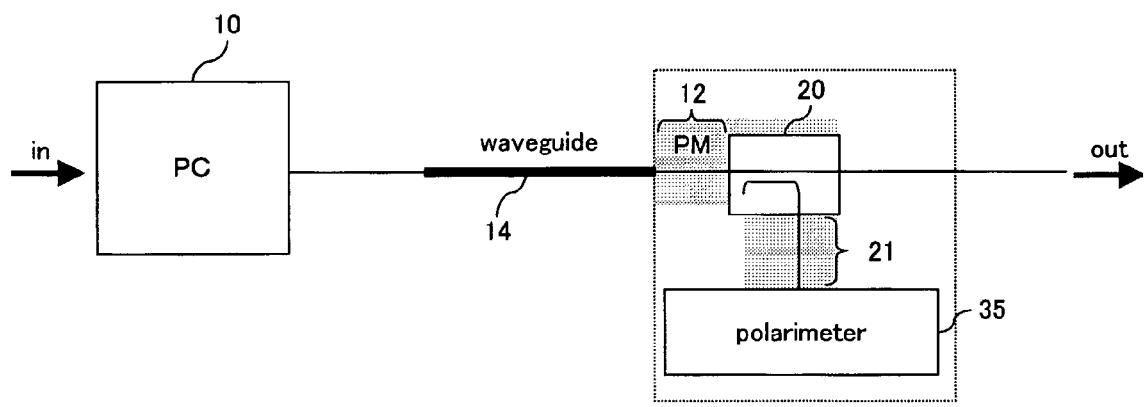
FIGS. 11 and 12 show the ninth and tenth embodiments of the present invention.
Figure 12:
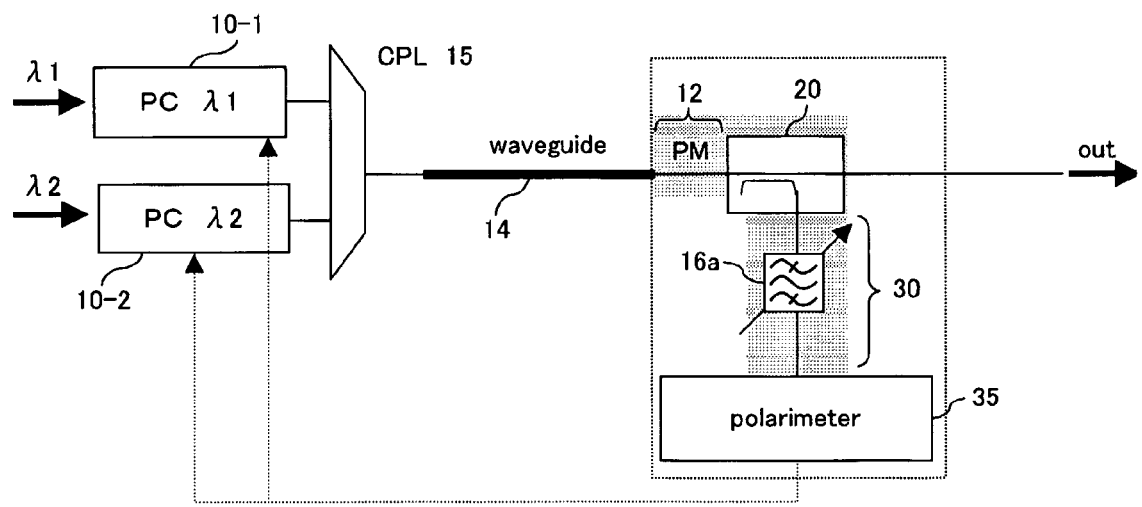

FIGS. 11 and 12 show the ninth and tenth embodiments of the present invention.

Yet another configuration employs an optical power divider 20 after the waveguide 14 and a polarimeter 35 for monitoring the state of polarization. The optical power divider 20 is either directly attached to the waveguide 14 or connected to it by means of a polarization maintaining fiber 12. The polarimeter 35 is either directly attached to or integrated with the optical power divider 20, or connected to it by means of a polarization maintaining fiber 21 and 30. The power divider 20 and the tunable wavelength filter 16a are preferably polarization independent ones. Based on the measured state of polarization the input polarization is adjusted such that the output polarization is linearized.

In addition, a polarization independent tunable wavelength filter 16a can be used in the monitoring branch of the optical power divider 20 in order to allow for wavelength selective alignment and monitoring. The tunable wavelength filter 16a is either directly attached to the power divider 20 or connected to it by means of a polarization maintaining fiber 30. The polarimeter 35 connected to the tunable wavelength filter 16a by means of a polarization maintaining fiber 30.

Another configuration is based on the same concept but with the optical power divider placed at the input port of the waveguide, which has the drawback that it reduces the optical input power.

Figure 13:
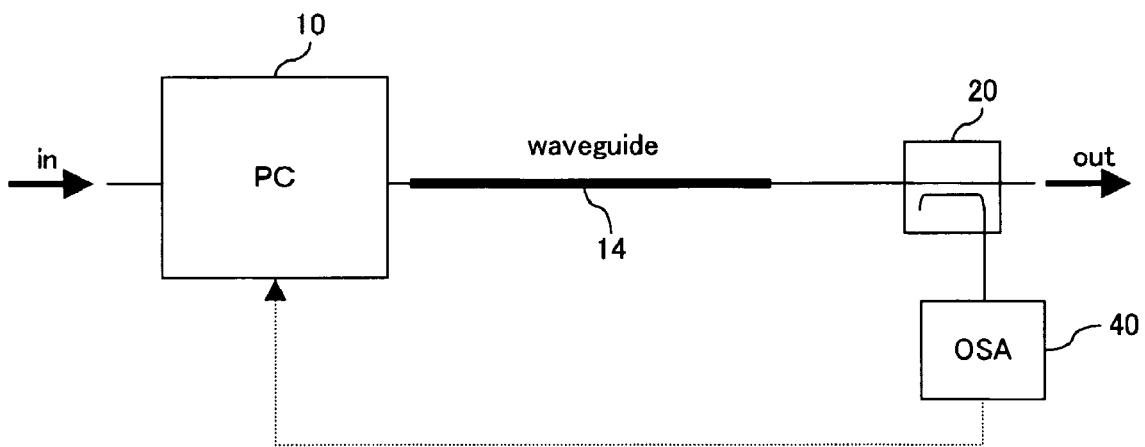
FIGS. 13 and 14 show the eleventh and twelfth embodiments of the present invention.
Figure 14:
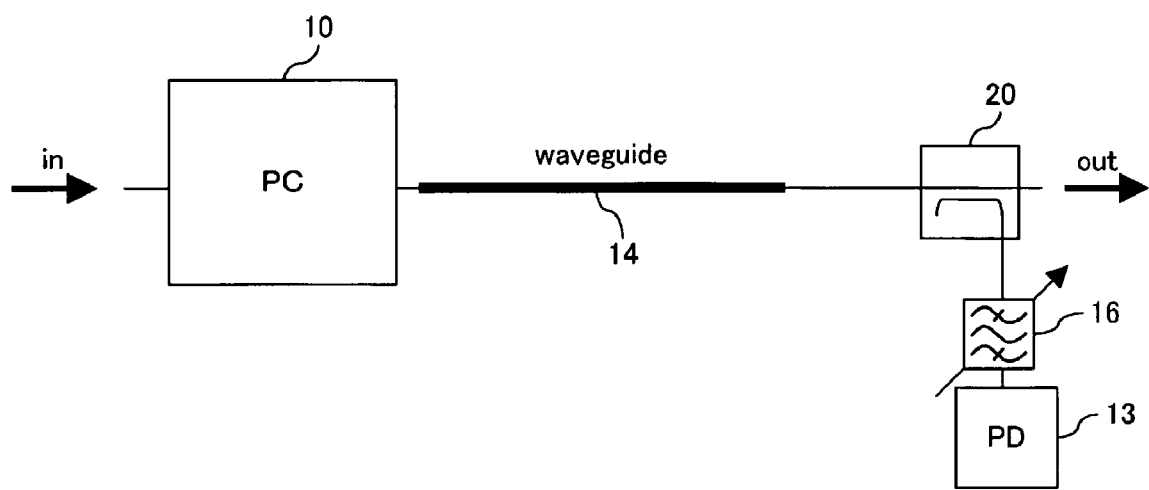

FIGS. 13 and 14 show the eleventh and twelfth embodiments of the present invention.

In the case of birefringent waveguide used for all-optical signal processing, the shape of the output spectrum depends on how precisely a single or two wavelengths are coupled into the desired principal axis of polarization of the waveguide 14. Thus, monitoring the optical spectrum allows optimizing the input polarization. A non-PM or polarization independent optical power divider 20 at the output of the waveguide 14 splits a part of the light to an optical spectrum analyzer 40 for monitoring the optical spectrum. The input polarization is adjusted such that the shape of the spectrum is optimized in the desired way (e.g. flat high power output in the case of supercontinuum generation), which correlates to the coupling into a principal axis of polarization with the desired chromatic dispersion characteristic.

For certain nonlinear signal applications (e.g. four wave mixing, cross-phase modulation (XPM), supercontinuum generation), it is sufficient to monitor only the optical power in a certain part of the optical spectrum. A non-PM or polarization independent optical power divider 20 at the output of the waveguide 14 splits a part of the light to an optical filter 16 for monitoring the power of the desired spectral component. The optical power of the spectral component is used as feedback signal for adjusting the input polarization. The optical filter 16 can be an optical tunable wavelength filter which can change the pass wavelength.

Figure 15:
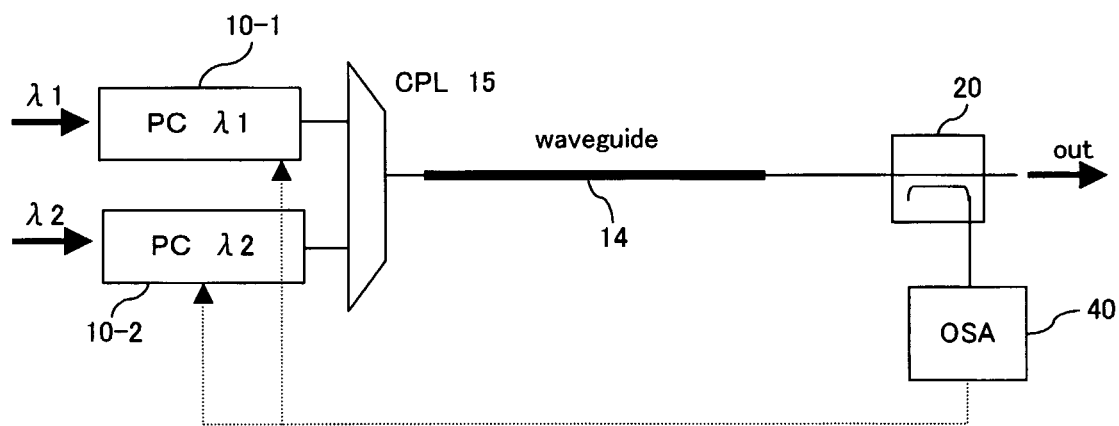
FIGS. 15 and 16 show the thirteenth and fourteenth embodiments of the present invention.
Figure 16:
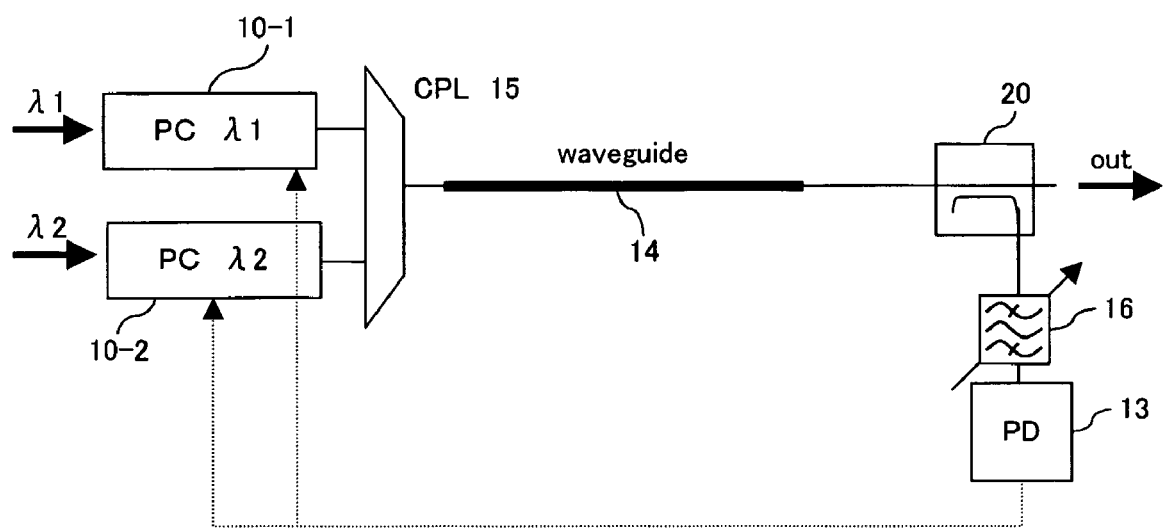

FIGS. 15 and 16 show the thirteenth and fourteenth embodiments of the present invention.

These embodiments are modifications of the embodiments of FIGS. 13 and 14 in order to accommodate multiple wavelength cases. FIG. 15 corresponds to FIG. 13 and FIG. 16 corresponds to FIG. 14.

In FIG. 15, PC 10-1 and 10-2 control polarizations of lights of each wavelength. The output lights are coupled by coupler 15 and outputted to waveguide 14. After propagation along the waveguide 14, light is inputted to the power divider 20. The power divider 20 splits the light to the optical spectrum analyzer 40. The optical spectrum analyzer analyzes the spectrum of the light and sends back the signal obtained from the analysis to each PC 10-1 and 10-2. Each PC 10-1 and 10-2 adjusts polarization of each wavelength to an optimized one.

In FIG. 16, the wavelength filter 16 and photodiode 13 are provided in place of the optical spectrum analyzer 40. The wavelength filter 16 selects and passes a specific wavelength to PD 13. PD 13 detects the power of the light of the selected wavelength. The result of the detection is fed back to PCs 10-1 and 10-2 and used to control polarization of each wavelength. Of course, the number of the wavelengths is not limited to 2, but can be an arbitrary number.

The invention claimed is:

1. A control apparatus for an adaptive adjustment of the input polarization to a polarization-maintaining waveguide component, comprising:

a polarization control unit controlling a polarization state of an input light to the polarization-maintaining waveguide component according to an input signal fed back from an output side of the polarization-maintaining waveguide component so that a polarization of an input light to the polarization maintaining waveguide component matches to a principal axis of polarization of the polarization maintaining waveguide component;

a polarization monitor unit monitoring the polarization state at an output of the polarization-maintaining waveguide component and feeding back a monitoring result to the polarization control unit as the input signal, wherein the polarization monitor unit further monitors an existence or disappearance of an optical signal traveling through the polarization-maintaining waveguide component, wherein the polarization monitor unit comprises:

an optical power divider placed after the polarization-maintaining waveguide component, a polarization selective unit connected to one port of the optical power divider with its polarization axis aligned to that of a principal axis of polarization of the polarization-maintaining waveguide component, and a monitoring unit connected to the polarization selective unit for optical power detection and providing a feedback signal to the polarization control unit, further comprising an optical switch, and wherein the polarization selective unit is a polarization beam splitter and the monitoring unit, the optical switch is connected to output ports of the polarization beam splitter, and the monitoring unit includes a tunable wavelength filter connected to an output of the optical switch.

2. A control apparatus for an adaptive adjustment of the input polarization to a polarization-maintaining waveguide component, comprising:

a polarization control unit controlling a polarization state of an input light to the polarization-maintaining waveguide component according to an input signal fed back from an output side of the polarization-maintaining waveguide component so that a polarization of an input light to the polarization maintaining waveguide component matches to a principal axis of polarization of the polarization maintaining waveguide component;

a polarization monitor unit monitoring the polarization state at an output of the polarization-maintaining waveguide component and feeding back a monitoring result to the polarization control unit as the input signal, wherein the polarization monitor unit further monitors an existence or disappearance of an optical signal traveling through the polarization-maintaining waveguide component, wherein the polarization monitor unit comprises:

an optical power divider placed after the polarization-maintaining waveguide component, a polarization selective unit connected to one port of the optical power divider with its polarization axis aligned to that of a principal axis of polarization of the polarization-maintaining waveguide component, and a monitoring unit connected to the polarization selective unit for optical power detection and providing a feedback signal to the polarization control unit, further comprising an optical switch, and wherein the polarization selective unit is a polarization beam splitter and the monitoring unit, the optical switch is connected to output ports of the polarization beam splitter, and the monitoring unit includes a wavelength demultiplexer connected to an output of the optical switch.

3. A control apparatus for an adaptive adjustment of the input polarization to a polarization-maintaining waveguide component, comprising:

a polarization control unit controlling a polarization state of an input light to the polarization-maintaining waveguide component according to an input signal fed back from an output side of the polarization-maintaining waveguide component so that a polarization of an input light to the polarization maintaining waveguide component matches to a principal axis of polarization of the polarization maintaining waveguide component;

a polarization monitor unit monitoring the polarization state at an output of the polarization-maintaining waveguide component and feeding back a monitoring result to the polarization control unit as the input signal, wherein the polarization monitor unit further monitors an existence or disappearance of an optical signal traveling through the polarization-maintaining waveguide component, and wherein the polarization monitor unit comprises:

an optical power divider placed after the polarization-maintaining waveguide component, a wavelength selective unit connected to one port of the optical power divider, a polarization selective unit connected to the wavelength selective unit with its polarization axis aligned to that of a principal axis of polarization of the polarization-maintaining waveguide component, and a monitoring unit connected to the polarization selective unit for optical power detection and providing a feedback signal to the polarization control unit.

4. The control apparatus according to claim 3, wherein the wavelength selective unit is a tunable wavelength filter and the polarization selective unit is a polarizer.

5. The control apparatus according to claim 3, wherein the wavelength selective unit is a tunable wavelength filter and the polarization selective unit includes a polarization beam splitter and photodiodes connected to the polarization beam splitter.

6. The control apparatus according to claim 3, wherein the wavelength selective unit is a wavelength demultiplexer and the polarization selective unit includes a polarization beam splitter connected to output ports of the wavelength demultiplexer and photodiodes connected to the polarization beam splitter.

* * * * *

UNITED STATES PATENT AND TRADEMARK OFFICE
CERTIFICATE OF CORRECTION

PATENT NO.       : 7,428,349 B2
APPLICATION NO.  : 10/596602
DATED            : September 23, 2008
INVENTOR(S)      : Rainer Hainberger et al.

It is certified that error appears in the above-identified patent and that said Letters Patent is hereby corrected as shown below:

Title Page, Column 2 (OTHER PUBLICATIONS), Line 3, under "310.1-2205." insert -- H. Bissessur et al., "Extremely Small Polarization Independent Phased-Array Demultiplexers on InP", IEEE PHOTONICS TECHNOLOGY LETTERS, Vol. 8, No. 4, April 1996, Pages 554-556.

N. Mekada et al., "Polarization Independent, Linear-Tuned Interference Filter with Constant Transmission Characteristics Over 1530-1570-nm Tuning Range", IEEE PHOTONICS TECHNOLOGY LETTERS, Vol. 9, No. 6, June 1997, Pages 782-784.

Ivan P. KAMINOW et al., "Optical Fiber Telecommunications IIIB", Lucent Technologies, 1997, Pages 362-363. --

Signed and Sealed this

Ninth Day of December, 2008

JON W. DUDAS
*Director of the United States Patent and Trademark Office*